(12) United States Patent  
Feraille et al.

(10) Patent No.: US 7,430,501 B2
(45) Date of Patent: Sep. 30, 2008

(54) DECISION SUPPORT METHOD FOR OIL RESERVOIR MANAGEMENT IN THE PRESENCE OF UNCERTAIN TECHNICAL AND ECONOMIC PARAMETERS

(75) Inventors: Mathieu Feraille, Nanterre (FR); Emmanuel Manceau, Rueil Malmaison (FR); Isabelle Zabalza-Mezghani, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 671 days.

(21) Appl. No.: 10/857,937

(22) Filed: Jun. 2, 2004

(65) Prior Publication Data

US 2005/0096893 A1    May 5, 2005

(30) Foreign Application Priority Data

Jun. 2, 2003    (FR)    ................................. 03 06636

(51) Int. Cl.
   *G06G 7/48*    (2006.01)
(52) U.S. Cl. ........................................................ 703/10
(58) Field of Classification Search .................... 703/10
   See application file for complete search history.

(56) References Cited

U.S. PATENT DOCUMENTS 6,612,382 B2 * 9/2003 King ............................... 702/9
7,054,752 B2 * 5/2006 Zabalza-Mezghani et al. 703/10
2002/0138241 A1 * 9/2002 Storm et al. ................... 703/10

OTHER PUBLICATIONS

Dejean et al., Oct. 3-6, 1999, SPE Annual Technical Conference and Exhibition, Managing Uncertainties on Production Predictions Using Intetrated Statistical Methods. pp. 1-15.*
Floris et al., "Integrated Scenario and Probabilistic Analysis for Asset Decision Support", Petroleum Statistical Geoscience, vol. 8., 2002, pp. 1-6.*

* cited by examiner

*Primary Examiner*—Paul L Rodriguez
*Assistant Examiner*—Eunhee Kim
(74) *Attorney, Agent, or Firm*—Antonelli, Terry, Stout & Kraus, LLP.

(57) ABSTRACT

The method of the invention is applicable to oil production to obtain the impact of technical and economic uncertainties on the economic profitability of a reservoir and/or to optimize the position of a new well in order to meet a development strategy. The invention includes in stage 1, uncertain technical parameters having an influence on the reservoir production are selected; in stage 2, an analytic model expressing the reservoir production in the course of time is determined as a function of the parameters selected in stage 1, from production values obtained by means of a flow simulator; and in stage 3, a model expressing the economic profitability of the reservoir is determined as a function of the technical and economic parameters, from the analytic model determined in stage 2.

13 Claims, 2 Drawing Sheets

DECISION SUPPORT METHOD FOR OIL RESERVOIR MANAGEMENT IN THE PRESENCE OF UNCERTAIN TECHNICAL AND ECONOMIC PARAMETERS

BACKGROUND OF THE INVENTION

1. Field of the Invention

The present invention relates to a method of accounting for technical uncertainties, while keeping the underlying physical reality, and rapidly, in an oil reservoir providing an economic profitability study.

2. Description of the Prior Art

According to the prior art, in the petroleum industry, an economic reservoir profitability study is generally based on production profiles determined beforehand. Determination of several oil production profiles, i.e. the evolution of the reservoir production in the course of time, is carried out by selecting several possible scenarios, for example highly likely, likely and unlikely, related to the uncertain technical parameters of the reservoir. Production of a reservoir in the course of time is defined by the evolution of its fluid production in the course of time. It can be, for example, the evolution with time of the oil and/or gas and/or water production of the reservoir. Oil production scenarios are established by means of a reservoir flow simulation software. The economic profitability study is then performed on uncertain economic parameters for each scenario. The scenario method is used so as to limit the number of flow simulations, costly in calculating time, that are required for the economic profitability study.

For each scenario, the method according to the prior art allows obtaining the uncertainties associated with the economic profitability of the reservoir (net present value, internal rate of return, etc.) by defining probability densities associated with the uncertain economic parameters, then using Monte Carlo type methods. This method thus allows determining the uncertainty on the economic profitability of a reservoir due to economic parameters for previously determined and fixed production scenarios which are a function of the uncertain technical parameters related to the reservoir.

However, the methods according to the prior art present inadequacies due notably to the fact that the impact of each technical parameter on the economic profitability of the reservoir is not taken into account directly and explicitly. In fact, the technical parameters are taken into account globally in the definition of the production scenarios (established by numerical flow simulation), which include all the uncertain technical parameters. It is therefore not possible, for example, to quantify the impact of a given uncertain technical parameter (aquifer activity, porosity, permeability, etc.) on the economic profitability of the reservoir or to optimize the position of a well in order to maximize this profitability. In general terms, with the methods of the prior art, it is not possible to rapidly and systematically carry out risk studies about the economic profitability of a reservoir by integrating directly the economic as well as the technical uncertain parameters.

SUMMARY OF THE INVENTION

In general terms, the method according to the invention evaluates the economic profitability of a reservoir by taking account of technical and economic parameters inherent in the reservoir. The method according to the invention allows accounting for uncertain technical parameters, by keeping the underlying physical reality, and rapidly, in addition to the economic uncertain parameters in an economic profitability study.

The method can be implemented for example in the field of oil production to obtain the impact of the uncertainties on the economic profitability of a reservoir and/or to optimize the position of a new well in order to meet a development strategy (net present value maximization, . . . ) by taking account of the technical and economic uncertainties. In general terms, the method allows carrying out risk studies on the economic profitability of a reservoir by taking account of technical and economic uncertainties.

In general terms, the invention relates to a method for best conducting the development of a hydrocarbon reservoir modelled by a flow simulator, by taking account of the economic implications of uncertain technical parameters that influence the reservoir production, the flow simulator being constructed from known physical data as a function of technical parameters wherein the following stages are carried out:

a) selecting a number of the technical parameters involved in the flow simulator;

b) determining a first analytic model relating the reservoir production as a function of time, by taking account of the parameters selected in stage a) and best matching a certain finite number of production values obtained by means of the reservoir simulator; this stage allows replacing the flow simulator, costly in calculating time, by a very fast analytic model while remaining coherent with the physical reality connecting the input technical uncertainties of the numerical simulator to the output data (production, . . . );

c) from the first analytic model determined in stage b), determining a second analytic model expressing the economic profitability of the reservoir as a function of the technical parameters determined in stage a) and of selected economic parameters, wherefrom an evaluation of a decision support criterion determined by taking account of the production uncertainties linked with the uncertain technical parameters is deduced; and d) modifying the reservoir development conditions on the basis of the evaluation obtained for the decision support criterion.

From the second model determined in stage c), relative interaction of the technical and economic parameters on the economic profitability of the reservoir can be quantified by means of a sensitivity analysis for example.

From the second model determined in stage c), it is possible to determine the uncertainties on the reservoir profitability as a function of the uncertainties on the technical and economic parameters. For example, a probability density is associated with each one of said technical and economic parameters, then a resampling method is used (Monte Carlo or Bootstrap method).

From the second model determined in stage c), at least one of the technical and economic parameters can be optimized. For example, the following stages are carried out: i) randomly drawing several values of at least one of the parameters intrinsic to the reservoir according to its uncertainty law, ii) determining the values of at least one of the parameters related to the reservoir development options so as to optimize the production criterion for each value drawn in stage i), iii) from the values determined in stage ii), the optimum distribution of the parameters related to the reservoir development options is obtained.

In stage b), the first analytic model can be determined using an experimental design, each experiment simulating the oil reservoir carried out by the flow simulator. The analytic model can also be determined using neural networks.

In stage a), at least one of the uncertain technical parameters related to the reservoir can be of discrete, continuous or stochastic type.

In stage d), the development conditions modification can be relative to the drilling of a new well, the drilling site of a new well, the evolution of the development scheme, the positioning of completions, the fluid recovery type.

In stage c), the decision support criterion can be the economic profitability of the reservoir.

Implementation of the method according to the invention allows obtaining economic models coherently linked with the physics and rapidly with the uncertain technical parameters. The risk studies carried out with these models thus provide more realistic results allowing quantification of the real impact of each source of technical uncertainty (permeability, porosity, position of a well, . . . ) on the economic profitability of the reservoir.

BRIEF DESCRIPTION OF THE DRAWINGS

Other features and advantages of the invention will be clear from reading the description hereafter with reference to the accompanying drawings wherein.

DETAILED DESCRIPTION OF THE INVENTION

Figure 1:
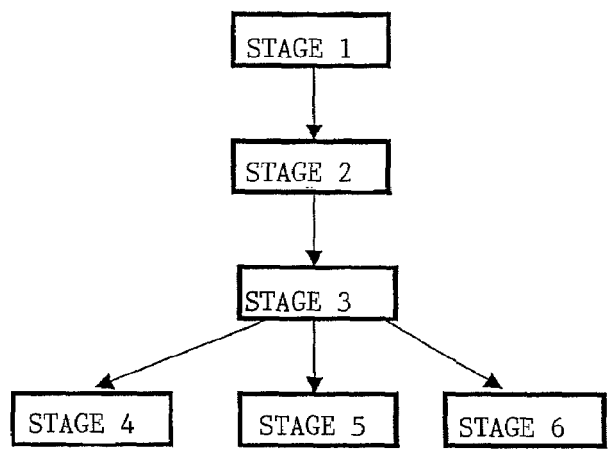
FIG. 1 diagrammatically shows the method according to the invention.

The method according to the invention, described in connection with FIG. 1, allows evaluation of the economic profitability of a reservoir by taking directly into account its economic and technical uncertainties. In each stage of the method, the example of an oil reservoir with some technical and economic parameters of which are uncertain is considered.

Stage 1: Determination of the Uncertain Parameters

The first stage of the method selects the uncertain technical parameters linked with the reservoir being considered and in associating therewith an uncertain domain. Selection of the uncertain parameters can be made either in relation to the physical knowledge of the reservoir or by carrying out a sensitivity study. These parameters can be of stochastic, discrete or deterministic type, they just have to be involved in the workflow (geologic, geostatistical, structural modelling, upscaling, flow simulation, etc.) of the reservoir flow model to be taken into account.

A deterministic parameter is a continuous parameter whose values range between a minimum and a maximum, and which has a continuous effect on reservoir simulation results. Some examples of conventional deterministic parameters are:
- petrophysical parameters such as porosity and permeability,
- the position, flow rate, productivity index of a well or of a group of wells.

The characteristic of a stochastic parameter is defined by the fact that a continuous variation has a random effect on the reservoir simulation results, such as the cumulative oil at a given time. Examples of stochastic parameters are:
- various geostatistical terms allowing obtaining different equiprobable geostatistical realizations,
- various equiprobable reservoir models calibrated on the production data,
- various structural maps of the floor or of the top of the reservoir.

The impact of this type of parameter cannot be taken into account via the conventional theory of response surface methodology and experimental designs. It is then recommended to use the joint modelling method described in the following documents:

1. Zabalza-Mezghani, I., "Analyse Statistique et Planification d'Experience en ingénierie de réservoir", IFP Thesis, 24 May 2000.
2. E. Manceau, M. Mezghani, I. Zabalza-Mezghani and F. Roggero, IFP, "Combination of Experimental Design and Joint Modeling Methods for Quantifying the Risk Associated with Deterministic and Stochastic Uncertainties—An Integrated Test Study", SPE 71620, SPE Annual Technical Conference and Exhibition, New Orleans, La., 30 Sep.-3 Oct. 2001.
3. M. Feraille, E. Manceau, I. Zabalza-Mezghani, F. Roggero, L.-Y. Hu, IFP, L. Costa Reis, Petrobras, "Integration of Dynamic Data in a Mature Oil Field Reservoir Model to Reduce the Uncertainty on Production Forecasting", AAPG Annual meeting, Salt Lake City, Utah, 11-14 May 2003.

Discrete parameters are parameters that can take a finite number of values. Examples of discrete parameters are:
- completion of a well, perforation of layers 1, 2 and 3 or only 1 and 2,
- the nature of a fault, permeable or impermeable.

For this type of parameter, it is advantageous to use specific experimental designs such as those defined in French patent application FR 2 837 947.

In an example, the reservoir has 5 porous and permeable layers, numbered 1 to 5 from the top. Layers 1, 2, 3 and 5 are of good quality whereas layer 4 is of bad quality in terms of porosity and permeability. The $1^{st}$ uncertain deterministic parameter is considered as a permeability multiplier for layers 1, 2, 3 and 5 with which a minimum and a maximum are associated: $MPH1 \in [MPH1_{min}, MPH1_{max}]$. The $2^{nd}$ uncertain deterministic parameter corresponds to the force of the aquifer: $AQUI \in [AQUI_{min}, AQUI_{max}]$. The $3^{rd}$ uncertain deterministic parameter corresponds to the residual oil saturation after water sweep: $SORW \in \{SORW_{min}, SORW_{max}\}$. The $4^{th}$ and $5^{th}$ uncertain deterministic parameters are the positions along the abscissas and ordinates of well P1 in cell number of the reservoir model: $PIX \in [P1X_{min}, P1X_{max}]$ and $P1Y \in [P1Y_{min}, P1Y_{max}]$. Thus, 5 deterministic uncertain parameters have been defined. The uncertain domain is defined in Table 1.

TABLE 1

Definition of the uncertain domain linked with the technical parameters

|  | Min | Max |
|---|---|---|
| MPH1 | 0.8 | 1.2 |
| SORW | 0.15 | 0.25 |
| AQUI | 0.2 | 0.3 |
| P1X | 6 | 11 |
| P1Y | 21 | 23 |

Stage 2: Flow Simulator Approximation

The oil reservoir is simulated by means of a numerical reservoir simulator. The reservoir simulator or flow simulator notably allows calculation of the production, for example of water, oil and/or gas, of the reservoir in the course of time as a function of technical parameters linked with the reservoir model such as, for example, the number of layers and of grid cells of the reservoir, the porosity and permeability of the cells, the aquifer force, physical parameters relative to the fluids involved (PVT studies, etc.), the position of the oil wells and their production constraints, etc.

An analytic model expressing the reservoir production in the course of time is determined from a finite number of reservoir production values, the values being obtained by means of the flow simulator. Production simulations are carried out by varying the different parameters selected in stage 1. The analytic model can be determined by means of mathematical methods such as experimental designs, neural networks, etc.

In cases where the experimental design method is used, according to the type and to the number of uncertain parameters determined, there are suitable experimental designs defining a number of numerical simulations to be carried out in order to characterize the uncertain domain in a rigorous and homogeneous manner. It is thus possible to rapidly and correctly analyze the influence of each uncertain parameter. It is possible to use the experimental designs described in the following documents:

4. Dejean, J. P. and Blanc, G., "Managing Uncertainties on Production Predictions Using Integrated Statistical Methods", SPE 56696, SPE Annual Technical Conference and Exhibition, Houston, USA, Oct. 3-6, 1999.
5. Box, G. E. P. and Hunter, J. S., "The 2k-p Fractional Factorial Designs", Part I, Technometrics, 2, 311-352, 1961a,
6. Box, G. E. P. and Hunter, J. S., "The 2k-p Fractional Factorial Designs", Part II, Technometrics, 3, 449-458, 1961b.
7. Box, G. E. P. and Wilson, K. B., "On the Experimental Attainment of Optimum Conditions", Journal of the Royal Statistical Society, Series B, 13, 1-45.
8. Draper, N. R., "Small Composite Designs", Technometrics, 27, 173-180, 1985.
9. Atkinson, A. C. and Donev, A. N., "Optimum Experimental Designs", Oxford University Press, 1992.

If experimental designs are used, it is possible, from the simulation results of the design, using statistical modelling, to relate by one or more analytic functions the simulation results, referred to as responses, to the uncertain parameters. A response corresponds to a simulation result at a given time for all the simulations of the design, for example, the oil cumulative of the reservoir at a given time for the N simulations of the experimental design. The form of the analytic function(s) depends on the experimental design selected and on the type of parameters. For example, when a stochastic parameter and deterministic parameters are defined, the joint modelling method described in the aforementioned documents [1, 2, 3] can be used and leads to the definition of two analytic functions, the first one reproducing the average and the second one the dispersion of the response considered.

Using mathematical methods such as experimental designs, neural networks, and using suitable statistical tools has the advantage of replacing the flow simulator, very costly in calculating time, by one or more very fast analytic functions, valid on the uncertain domain, allowing transcribing the evolution of a production response as a function of the uncertain parameters. Furthermore, it is important to note that the defined analytic functions do not depend on the probability density of the uncertain technical parameters but only on their upper and lower boundaries.

It is thus possible to replace by several analytic functions the production profile of a reservoir, which just requires determination of the analytic functions giving the reservoir production as a function of the technical parameters, for each production year. For example, the cumulative oil production for each production year corresponds to as many responses as years to be related to one or more analytic functions.

In the following example, polynomial functions are determined allowing relating the cumulative oil production for each one of the twelve years of the production profile to the five deterministic uncertain parameters defined in stage 1. An experimental design of order 2 is selected suited to five deterministic parameters having the characteristics described in Table 2 and allowing accounting for the terms described in Table 3.

TABLE 2

Characteristics of the experimental design
Design properties

| Design type | Central Composite-Face Centered |
|---|---|
| Number of parameters | 5 |
| Number of simulations | 27 |

TABLE 3

Terms taken into account in the polynomial models
Terms taken into account in the analytic model

| Main | Interactions | Quadratic |
|---|---|---|
| MPH1 | MPH1:SORW | MPH1$^2$ |
| SORW | MPH1:AQUI | SORW$^2$ |
| AQUI | MPH1:P1X | AQUI$^2$ |
| P1X | MPH1:P1Y | P1X$^2$ |
| P1Y | SORW:AQUI | P1Y$^2$ |
|  | SORW:P1X |  |
|  | SORW:P1Y |  |
|  | AQUI:P1X |  |
|  | AQUI:P1Y |  |
|  | P1X:P1Y |  |

The twenty-seven simulations corresponding to the simulations of the design were launched in order to obtain twenty-seven simulated results for the cumulative oil production for each year of the production profile. From these results, twelve polynomial models were constructed, using the statistical response surface method, in order to approach the flow simulator on the uncertain domain for the twelve simulated years.

Stage 3: Construction of the economic profitability model of a reservoir

The production profile of a reservoir is defined by the analytic model determined in stage 2. The flow simulator, very costly in calculating time, is thus replaced by an analytic model allowing relation of the production in the course of time to the uncertain technical parameters instantly, while keeping the underlying physical reality.

According to the invention, the production profile of the thus defined reservoir can be used in an economic study to directly and explicitly relate the uncertainties on each technical parameter to the uncertainty on the economic profitability of the reservoir. Thus, after defining economic uncertain parameters, it is possible to evaluate and to quantify the uncertainty on the economic profitability of a reservoir, due to its economic and technical uncertain parameters.

A model expressing the economic profitability of a reservoir is determined as a function of the technical parameters selected in stage 1 and as a function of economic parameters, using the analytic model determined in stage 2. For example, the economic profitability can be the Net Present Value (NPV) of the reservoir, or other economic results linked with the reservoir. The economic parameters are selected in connection with the economic profitability of the reservoir, for example the reservoir operating costs, the discount rate.

In our example, two uncertain economic parameters have been defined. The $1^{st}$ uncertain economic parameter corresponds to the reservoir operating cost in $/bb1 with which a minimum and a maximum are associated: OPEX $\in$ [$OPEX_{min}$, $OPEX_{max}$]. The $2^{nd}$ uncertain economic parameter corresponds to the discount rate: DISCRATE $\in$ [$DISCRATE_{min}$, $DISCRATE_{max}$]. In total seven deterministic uncertain parameters are obtained, among which two are technical, controllable and to be optimized (P1X and P1Y), three are technical and non-controllable (MPH1, AQUI and SORW) and two are economic (OPEX, DISCRATE). Table 4 gives a summary of these uncertain parameters.

TABLE 4

Summary of the technical and economic uncertain parameters

|  | Min | Max |
|---|---|---|
| MPH1 | 0.8 | 1.2 |
| SORW | 0.15 | 0.25 |
| AQUI | 0.2 | 0.3 |
| P1X | 6 | 11 |
| P1Y | 21 | 23 |
| OPEX | 2.5 | 3.5 |
| DISCRATE | 0.08 | 0.12 |

The economic model of the reservoir, which is generally fast, can be obtained by means of a spreadsheet type software, Excel for example, using the polynomial functions approaching the reservoir production profile determined in stage 2. A model expressing the Net Present Value of the reservoir is thus determined.

From the model determined in stage 3, which expresses the economic profitability of the reservoir, one or more of the following stages can be carried out:

Stage 4: qualifying each technical and economic uncertain parameter and their possible interactions on the economic profitability of a reservoir (in other terms, quantifying the relative influence of the parameters in relation to one another) by carrying out a sensitivity study, using for example experimental design methods and response surface methodologies, to construct a Pareto diagram, etc.

Stage 5: determining the uncertainties on the economic profitability of a reservoir as a function of the technical and economic uncertain parameters using resampling methods, for example by associating with each uncertain parameter a probability density, then using the Monte Carlo method, the Bootstrap method, etc.

Stage 6: optimizing uncertain but controllable technical and economic parameters (position, well flow rate, contractual negotiations, . . . ) in a deterministic or probable context so as to meet a development strategy (net present value maximization, . . . ).

In our example, at first (stage 4), the economic profitability model which expresses the NPV is used to qualify the technical and economic uncertain parameters as well as their interactions on the Net Present Value (NPV) of the reservoir. Then, secondly (stage 6), the model is used to optimize the position of well P1 (previous parameters P1X and P1Y) so as to maximize the NPV of the reservoir while keeping the other uncertain technical and economic parameters. Finally (stage 5), while maintaining the determined optimum position of the well fixed, the uncertainties due to the other uncertain parameters on the NPV of the reservoir are quantified more precisely.

Sensitivity study (stage 4): In order to qualify the seven technical and economic uncertain parameters on the NPV of the reservoir, the experimental design defined in Table 7 is selected.

TABLE 7

Characteristics of the experimental design
Design properties

| Design type | Central Composite-Face Centered |
|---|---|
| Number of parameters | 7 |
| Number of simulations | 79 |

Figure 2:
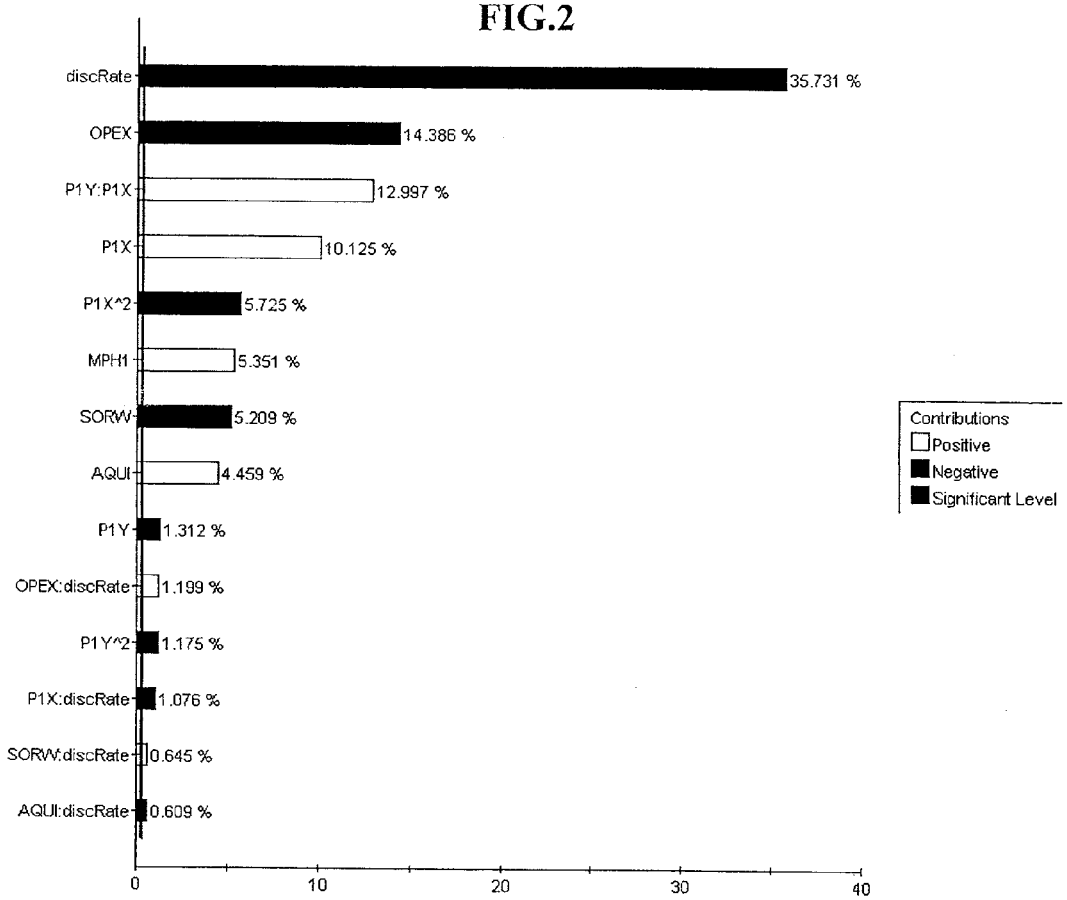
FIG. 2 corresponds to a Pareto diagram.

The corresponding experiments were carried out using the economic profitability model. An analytic model is constructed from the experiment results, using response surface modelling. This analytic model was then used to construct a Pareto diagram, shown in FIG. 2, useful for determination of the influence of each uncertain parameter on the NPV.

Production scheme optimization (stage 6): To optimize P1X and P1Y in order to maximize the NPV, it is possible to either approach the economic model by an analytic function using for example methods based on the experimental designs and on the response surface methodology, or to directly use the economic model without approaching it when it is fast enough for economic profitability calculations. In our example, economic calculation is very fast using directly the economic profitability model. Optimization of parameters P1X and P1Y is done in an uncertain context, for the other five parameters probability densities are associated. In this example, normal laws are used for the three technical parameters and uniform laws are used for the two economic parameters. Table 5 sums up the probability densities associated with each parameter.

TABLE 5

Summary of the probability densities associated with the non-optimized technical and economic uncertain parameters

|  | Density | Real | Normalized | Real | Normalized |
|---|---|---|---|---|---|
|  |  | Average | | Expectation | |
| MPH1 | Normal | 1 | 0 | 0.04 | 0.2 |
| SORW | Normal | 0.2 | 0 | 0.01 | 0.2 |
| AQUI | Normal | 0.25 | 0 | 0.01 | 0.2 |
|  |  | Minimum | | Maximum | |
| OPEX | Uniform | 2.5 | −1 | 3.5 | 1 |
| DISCRATE | Uniform | 0.08 | −1 | 0.12 | 1 |

Figure 3:
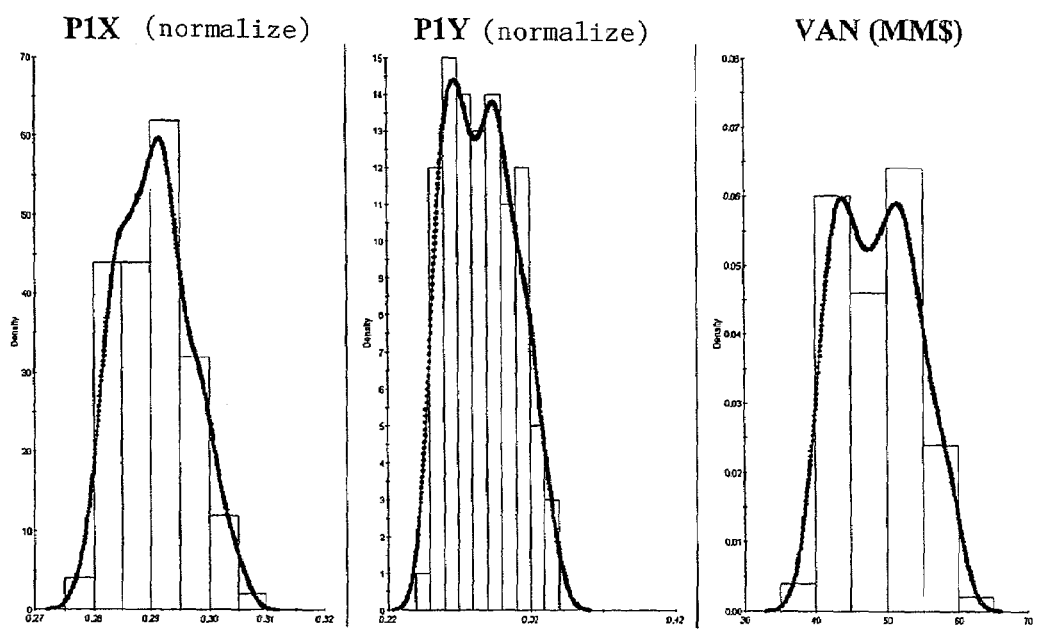
FIG. 3 shows three bar graphs obtained by means of an optimization method in a probably context.

Then, using the Monte Carlo method, a hundred points are drawn for each one of the five uncertain parameters (MPH1, AQUI, SORW, OPEX and DISCRATE) respecting their probability densities, then a hundred optimizations of P1X and P1Y are made in order to maximize a hundred times the NPV. The results correspond to the hundred optimization values of parameters PIX, P1Y and of the NPV. Bar graphs shown in FIG. 3 are constructed from these hundred values. Table 6 sums up the values of the quantiles.

TABLE 6

Quantiles P1X, P1Y and of the NPV obtained via optimization
of P1X and P1Y in an uncertain context

| Quantile | Optimization of P1Y (cell #) | | Optimization of P1X (cell #) | | Optimization of the NPV (106 m3) |
|---|---|---|---|---|---|
| | Real | Normalized | Real | Normalized | |
| P100 | 22.248 | 0.248 | 9.196 | 0.279 | 38.746 |
| P90 | 22.256 | 0.256 | 9.207 | 0.283 | 42.007 |
| P80 | 22.264 | 0.264 | 9.212 | 0.285 | 43.494 |
| P70 | 22.271 | 0.271 | 9.218 | 0.287 | 44.898 |
| P60 | 22.278 | 0.278 | 9.221 | 0.289 | 46.666 |
| P50 | 22.286 | 0.286 | 9.227 | 0.291 | 48.698 |
| P40 | 22.294 | 0.294 | 9.231 | 0.292 | 50.722 |
| P30 | 22.3 | 0.3 | 9.234 | 0.293 | 52.008 |
| P20 | 22.31 | 0.31 | 9.241 | 0.296 | 53.724 |
| P10 | 22.318 | 0.318 | 9.248 | 0.299 | 56.407 |
| P0 | 22.337 | 0.337 | 9.263 | 0.305 | 60.237 |

It can be seen that the optimum values of P1X and P1Y do not depend much, in this example, on the other uncertain parameters. The final and optimum values selected are P1X=9 and P1Y=22 because they correspond to cell numbers in the flow model and therefore have to be whole.

Figure 4:
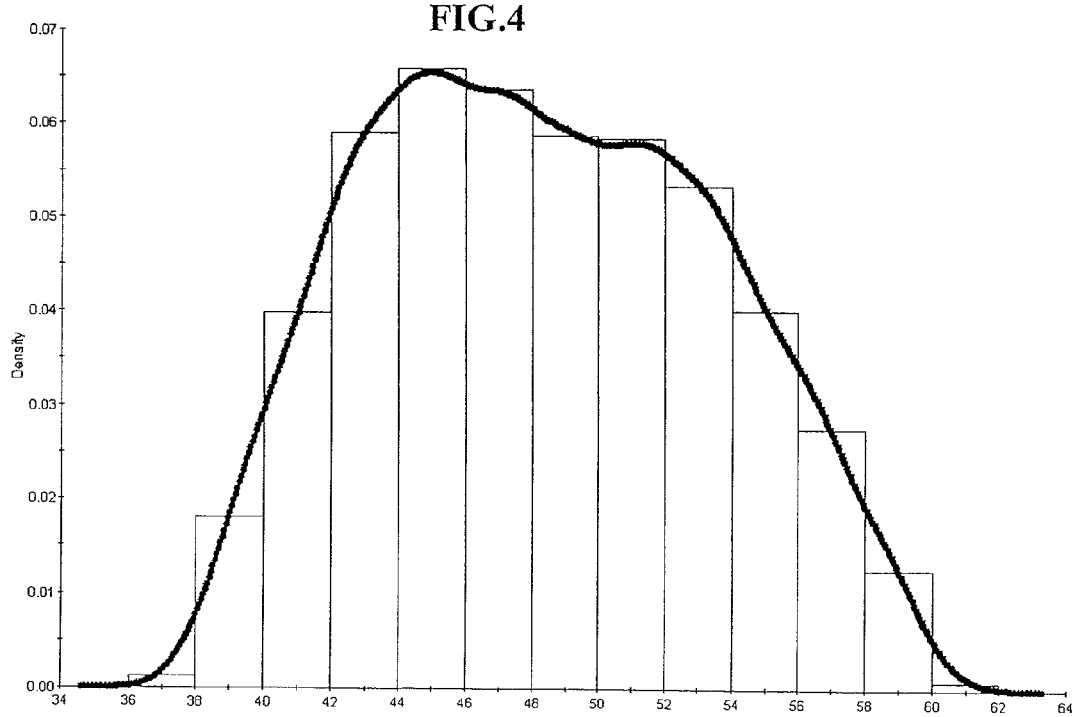
FIG. 4 shows a bar graph obtained by means of the Monte Carlo method.

Determination of the Probability Density for the Economic Profitability (Stage 5):

With this optimum value for the position of well P1, a new Monte Carlo sampling is carried out to obtain a bar graph and more precise quantiles (10,000 values) for the NPV of the reservoir, shown in FIG. 4.

In this example, two controllable technical parameters corresponding to the position X and Y of well P1 have been optimized in order to maximize the development strategy selected, linked with the economic profitability of the reservoir, i.e. its NPV, then we have quantified the impact of the other technical and economic uncertain parameters on the economic profitability of the reservoir in form of a bar graph and of quantiles/percentiles.

The invention claimed is:

1. A method for conducting development of a hydrocarbon reservoir modelled by a flow simulator, by taking account of economic implications of uncertain economic parameters and uncertain technical parameters associated with an uncertain domain that influence a production of the reservoir, the flow simulator being constructed from known physical data as a function of the technical parameters, comprising the steps:
   a) selecting a number of the uncertain technical parameters involved in the flow simulator;
   b) determining a first analytic model relating the production of the reservoir as a function of time, by taking account of the uncertain technical parameters selected in step a) and matching a finite number of production values obtained by means of the flow simulator;
   c) from the first analytic model determined in step b), determining a second analytic model as a function of the uncertain technical parameters determined in step a) and of selected economic implications of the uncertain economic parameters, wherefrom an evaluation of a decision support criterion determined by taking account of production uncertainties linked with the selected economic implications of the uncertain economic parameters and the uncertain technical parameters is deduced; and
   d) modifying development conditions of the hydrocarbon reservoir based on an evaluation obtained for the decision support criterion.

2. The method as claimed in claim 1 wherein, from the second model determined in step c), an interaction of the uncertain technical parameters and the economic implications of the uncertain economic parameters on an economic profitability of the reservoir are quantified.

3. The method as claimed in claim 2, wherein a sensitivity analysis is carried out.

4. The method as claimed in claim 1 wherein, from the second model determined in step c), uncertainties of profitability of the reservoir are determined as a function of the uncertain technical parameters and the economic implications of the uncertain economic parameters.

5. The method as claimed in claim 4, wherein a probability density is associated with each of the uncertain technical parameters and the economic implications of the uncertain economic parameters and then a resampling method is used.

6. The method as claimed in claim 5, wherein one of a Monte Carlo or a Bootstrap method is used.

7. The method as claimed in claim 1 wherein, from the second model determined in step c), at least one of the uncertain technical parameters and the economic implications of the uncertain economic parameters is optimized.

8. The method as claimed in claim 7, wherein i) values of at least one of uncertain technical parameter intrinsic to the reservoir are randomly drawn according to a law of the at least one uncertain technical parameter, ii) values of at least one of the uncertain parameters related to development options of the reservoir are determined to optimize a production criterion for each value from step i), iii) from values determined in step ii), an optimum distribution of the uncertain parameters related to the development options of the reservoir is obtained.

9. The method as claimed in claim 1 wherein, in step b), the first analytic model is determined using an experimental design including a simulation of the hydrocarbon reservoir carried out by the flow simulator.

10. The method as claimed in claim 1 wherein, in step b), the first analytic model is determined using neural networks.

11. The method as claimed in claim 1 wherein, in step a), at least one of the uncertain technical parameters linked with the hydrocarbon reservoir is of a discrete, continuous or stochastic type.

12. The method as claimed in claim 1 wherein, in step d), the modifying relates to drilling of a new well, to a drilling site of a new well, to evolution of a development scheme, or positioning of completion of a fluid recovery type.

13. The method as claimed in claim 1 wherein, in step c), the decision support criterion is an economic profitability of the hydrocarbon reservoir.

* * * * *